(12) United States Patent
Preston et al.

(10) Patent No.: US 10,814,894 B2
(45) Date of Patent: Oct. 27, 2020

(54) RAILYARD CREW MEMBER VEST FOR USE WITHIN A RAILYARD

(71) Applicant: Railserve, Inc., Atlanta, GA (US)

(72) Inventors: Jon A. Preston, Atlanta, GA (US); Chris Burgess, Newnan, GA (US); Jeff Chastine, Atlanta, GA (US); Anthony J. Giertych, Peachtree City, GA (US); John Roberts, Fayetteville, GA (US)

(73) Assignee: Railserve, Inc., Atlanta, GA (US)

( * ) Notice: Subject to any disclaimer, the term of this patent is extended or adjusted under 35 U.S.C. 154(b) by 0 days.

(21) Appl. No.: 16/739,283

(22) Filed: Jan. 10, 2020

(65) Prior Publication Data

US 2020/0148238 A1    May 14, 2020

Related U.S. Application Data

(63) Continuation of application No. 15/894,066, filed on Feb. 12, 2018, now Pat. No. 10,562,553.

(51) Int. Cl.

| | |
|---|---|
| *B61L 23/06* | (2006.01) |
| *H04N 7/18* | (2006.01) |
| *G08B 5/36* | (2006.01) |
| *H04N 5/33* | (2006.01) |
| *G01S 19/43* | (2010.01) |
| *A41D 1/04* | (2006.01) |
| *A41D 1/00* | (2018.01) |
| *A41D 13/01* | (2006.01) |
| *G01S 19/13* | (2010.01) |

(52) U.S. Cl.
CPC .............. *B61L 23/06* (2013.01); *A41D 1/002* (2013.01); *A41D 1/04* (2013.01); *A41D 13/01* (2013.01); *G01S 19/13* (2013.01); *G01S 19/43* (2013.01); *G08B 5/36* (2013.01); *H04N 5/33* (2013.01); *H04N 7/185* (2013.01); *A41D 2600/20* (2013.01)

(58) Field of Classification Search
None
See application file for complete search history.

(56) References Cited

U.S. PATENT DOCUMENTS

| | | | |
|---|---|---|---|
| 2004/0156616 A1* | 8/2004 | Strub | G11B 27/3027 386/224 |
| 2015/0301191 A1* | 10/2015 | Wallace | G01S 19/43 342/357.42 |
| 2018/0122205 A1* | 5/2018 | Mujeeb | A41D 1/04 |
| 2018/0249087 A1* | 8/2018 | Arnold | A41D 27/205 |
| 2018/0249133 A1 | 8/2018 | Thiel et al. | |
| 2019/0156642 A1 | 5/2019 | Royal et al. | |

* cited by examiner

*Primary Examiner* — Dakshesh D Parikh
(74) *Attorney, Agent, or Firm* — Arnold & Poerter Kaye Scholer LLP

(57) ABSTRACT

The present invention relates to a smart vest for use by railyard personnel at a railyard. The smart vest utilizes many safety features, such as improved visibility, a real-time camera, an environmental monitor, high-accuracy location tracking, tracking the "state" of the railyard crew member, real-time communication, and mobile power. Each of these features may be incorporated with the smart vest.

20 Claims, 8 Drawing Sheets

RAILYARD CREW MEMBER VEST FOR USE WITHIN A RAILYARD

CROSS-REFERENCE TO RELATED APPLICATIONS

This application is a continuation of U.S. patent application Ser. No. 15/894,066, filed Feb. 12, 2018, entitled RAILYARD CREW MEMBER VEST FOR USE WITHIN A RAILYARD, which is incorporated herein by reference in its entirety and made a part hereof.

FIELD OF THE INVENTION

The present invention relates to railcars and, more particularly, to a railyard crew member protection system for use within a railyard.

BACKGROUND

A railyard, railway yard or railroad yard is a complex series of railroad tracks for storing, sorting, or loading/unloading, railroad cars and/or locomotives. Railroad yards have many tracks in parallel for keeping rolling stock stored off the mainline, so that they do not obstruct the flow of traffic. Railroad cars are moved around by specially designed yard switchers, a type of locomotive. Cars in a railroad yard may be sorted by numerous categories, including Railroad Company, loaded or unloaded, destination, car type, or whether they need repairs. Railroad yards are normally built where there is a need to store cars while they are not being loaded or unloaded, or are waiting to be assembled into trains. Large yards may have a tower to control operations.

Many railway yards are located at strategic points on a main line. Main line yards are often composed of an Up yard and a Down yard, linked to the associated railroad direction. There are different types of yards, and different parts within a yard, depending on how they are built.

In all railway yards, a very dangerous action is performed when bringing railcars together and or apart. This action may be called a Shove Move which is the process of pushing a cut of cars or pushing a train from the rear and then coupling the cars together. Coupling utilizes a device located at both ends of all cars in a standard location to provide a means for connecting one railcar to another. A switching crew uses the locomotive to couple to and uncouple from railcars. The switching crew must communicate by radio, as the engineer in the cab of the locomotive usually cannot see where a long cut of cars is going, and relies on the crew member on the ground guiding them into position.

In these situations, there is always an opportunity for human error whenever a significant amount of verbal communication is required, and this will sometimes result in damage to person or property. The danger is that the locomotive engineer has no idea when the cars are being shoved or coupled without the assistance of ground personnel. Because of the danger of the shove and coupling move, the locomotive engineer also has no idea of the impact speed and the distance of the railcar. If the impact speed or distance is improperly determined by the locomotive engineer or ground personnel, the impact and coupling can cause damage to thousands of freight cars and millions of dollars of damage to couplers. In several cases, these accidents can cause injuries and even death to employees.

An objective standard to determine whether the railcars are moved safely is a desirable check to make sure the crew will not be impacting anything other than the next railcar targeted for coupling. A need exists for continuing to attempt to have complete visibility of people and machines in a railyard and providing real-time visual depiction of where a railyard crew is located within the railyard.

Figure 1:
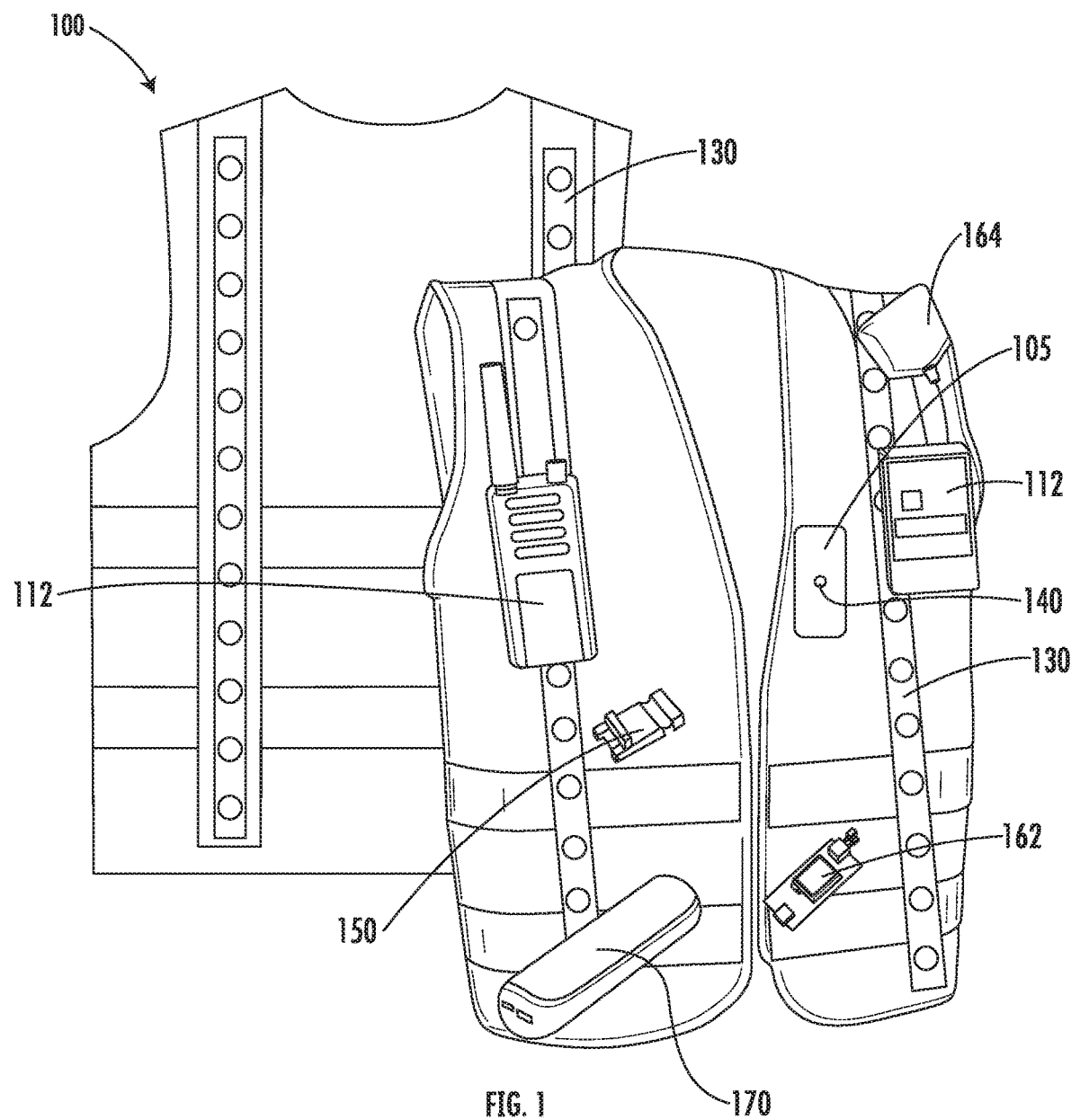
FIG. 1 is a front view and a rear view of a smart vest for use in a railyard in accordance with an embodiment of the present invention.

The reader is advised that the attached drawings are not necessarily drawn to scale.

SUMMARY OF INVENTION

In one embodiment in accordance with aspects of the disclosure, a vest for a railyard crew member for use in a railyard is disclosed. The vest may include a vest processor, an emergency action system, an LED lighting system, a real-time camera system, an environmental monitoring system, a high-accuracy location system, a mobile power unit, and a real-time communication system. The vest processor may include a processing unit and a system memory to store and execute software instructions. The emergency action system, LED lighting system, real-time camera system, environmental monitoring system, high-accuracy location system, mobile power unit, a real-time communication system may all be connected to the vest processor. The emergency action system may provide the railyard crew member an emergency stop protection should the railyard crew member observe a situation that is determined to be unsafe. The LED lighting system may include one or more front LED lighting strips and one or more rear LED lighting strips with the LED lighting strips including a plurality of LEDs. The real-time camera system may include a still picture capability and a video capability that captures and stores the pictures and videos on the vest processor. The environmental monitoring system may include a humidity sensor and a temperature sensor. The high-accuracy location system may include a real-time kinematics (RTK) module and a GPS antenna. The high-accuracy location system may utilize a global navigation satellite system (GNSS) and RTK to enable centimeter location accuracy of the railyard crew member for the high-accuracy location system. The mobile power unit may provide power to the vest processor and the vest. The real-time communication system may include a two-way radio that records and analyzes audio.

In another embodiment in accordance with aspects of the disclosure, a vest for a railyard crew member for use in a railyard is disclosed. The vest may include a vest processor and a high-accuracy location system. The vest processor may include a processing unit and a system memory to store and execute software instructions. The high-accuracy location system may connected to the vest processor. The high-accuracy location system may include: a base tower with a base tower GPS receiver and a base tower processor; a vest real-time kinematics (RTK) module and a vest GPS antenna located on the vest of the railyard crew member; a locomotive RTK module and a locomotive GPS antenna located on a locomotive within the railyard; a global navigation satellite system (GNSS) that provides autonomous geo-spatial positioning and is in communication with the base tower GPS receiver, the vest GPS antenna, and the locomotive GPS antenna; and a wireless Wi-Fi communication network that wirelessly connects the base tower processor, the vest RTK module, and the locomotive RTK module. The base tower may be located at a fixed and known location within the railyard. The location of the GNSS may be continually sent to the GPS receiver on the base tower, the GPS antenna on the vest, and the GPS antenna on the locomotive. The RTK module on the vest may establish an accurate location of the railyard crew member through the GNSS and the RTK module on the vest. The RTK module on the locomotive may establish an accurate location of the locomotive through the GNSS and the RTK module on the locomotive. The high-accuracy location system may determine a position of the railyard crew member with respect to one or more railcars in the railyard. The high-accuracy location system may determine a height of the railyard crew member with respect to the ground, and further wherein if the determined height is below a certain height, the railyard crew member will be determined to be on the ground and potentially in a dangerous condition, and if the determined height is above the certain height, the railyard crew member will be determined to be riding on one of the railcars and in a safe condition. Additionally, the vest processor may be in communication with and connected to a railyard site computer that provides a central analysis and a display site for the railyard. The high-accuracy location system may provide the locations of the railyard crew member and locomotive within the railyard to the railyard site computer to display the locations of the railyard crew member and the locomotive. The vest may further include a real-time camera system connected to the vest processor that may include a still picture capability and a video capability that captures and stores the pictures and videos on the vest processor, wherein the real-time camera system provides a real-time video of current operations and activities from the vest and sends the real-time video to the railyard site computer.

The details of these and other embodiments of the present invention are set forth in the accompanying drawings and the descriptions below. Other features and advantages of the invention will be apparent from the description and the drawings.

DETAILED DESCRIPTION OF EMBODIMENTS

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three dimensional orientation of structures in order to fall within the scope of this invention.

Figure 2:
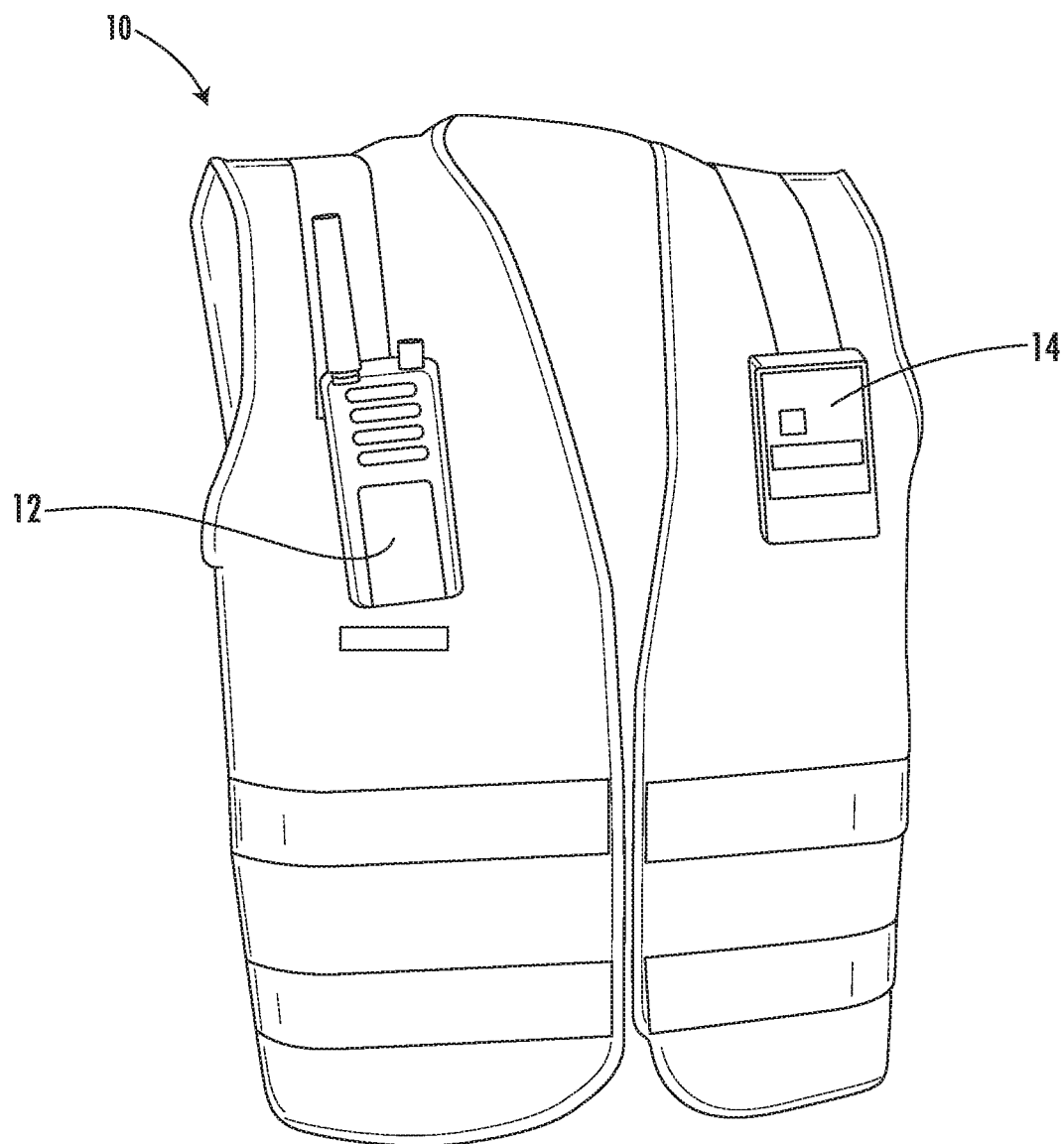
FIG. 2 is a view of an existing vest for use in a railyard in accordance with an embodiment of the present invention.

FIGS. 1 through 8 illustrate a next generation smart vest 100 for use by railyard personnel at a railyard. The smart vest 100 includes many features over the prior art versions of safety vests. A prior art version of a safety vest 10 is shown in FIG. 2. As illustrated in FIG. 2, the prior art version of the safety vest 10 includes a two-way radio 12 and an emergency action system 14 designed to provide crew members who work the ground emergency stop protection should they observe a situation that is determined to be unsafe if the move continues. However, the smart vest 100 illustrated in FIGS. 1 and 3-8 utilizes many additional features, such as improved visibility, a real-time camera, an environmental monitor, high-accuracy location tracking, tracking the "state" of the railyard crew member, real-time communication, and mobile power. Additional features not illustrated but may be included with this smart vest 100 without departing from the invention may include smart-heads-up-display goggles or glasses, a smaller/lighter smart vest, higher visibility smart vest, or a vest with better battery life. Each of these features may be incorporated with the smart vest 100 illustrated in FIGS. 1 and 3-8 without departing from this invention.

FIG. 1 specifically shows a smart vest 100 for use and wear by a railyard crew member on a railyard that includes all of the features: a two-way radio 112; an emergency action system 114; improved visibility via an LED lighting 130 on the front and the back of the vest 100; a real-time camera 140 connected to the vest 100; an environmental monitoring system 150 connected to the vest 100; a high-accuracy location system 160/162 connected to the vest 100; a mobile power unit 170 connected to the vest 100; and a real-time communication system 180 connected to the vest 100. FIGS. 3-8 detail each of these specific features for the vest 100 individually. The smart vest 100 may include one feature or any combination of these features without departing from the invention.

Additionally, the smart vest 100 may include a vest processor 105 to control and process various actions for the smart vest 100 as will be described further below. The vest processor 105 may be a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The one or more implementations described throughout this disclosure may utilize logical blocks, modules, and circuits that may be implemented or performed with the vest processor 105.

In a specific embodiment of the invention, the vest processor 105 may be a Raspbery Pi Zero W Computer. The Raspberry Pi Zero W may include one or more of the following features: 802.11 b/g/n wireless LAN; Bluetooth 4.1; Bluetooth Low Energy (BLE); 1 GHz, single-core CPU; 512 MB RAM; Mini HDMI and USB On-The-Go ports; Micro USB power; HAT-compatible 40-pin header; Composite video and reset headers; and CSI camera connector. Other similar processors may be utilized with these features that are known and used in the art.

The vest processor 105 may be used to implement various aspects and features described herein. As such, the vest processor 105 may be configured to execute multiple calculations, in parallel or serial and may execute coordinate transformations, curve smoothing, noise filtering, outlier removal, amplification, and summation processes, and the like. The vest processor 105 may include a processing unit and system memory to store and execute software instructions. The vest processor 105 may be in communication with and/or connected to a railyard site computer that may provide a central analysis and display site for the entire railyard. The railyard site computer may be monitored by a railyard supervisor.

Additionally, as illustrated in FIG. 1, the smart vest 100 may include an emergency action system 114. The emergency action system 114 may be designed to provide crew members who work the ground emergency stop protection should they observe a situation that is determined to be unsafe if the move continues.

Figure 3:
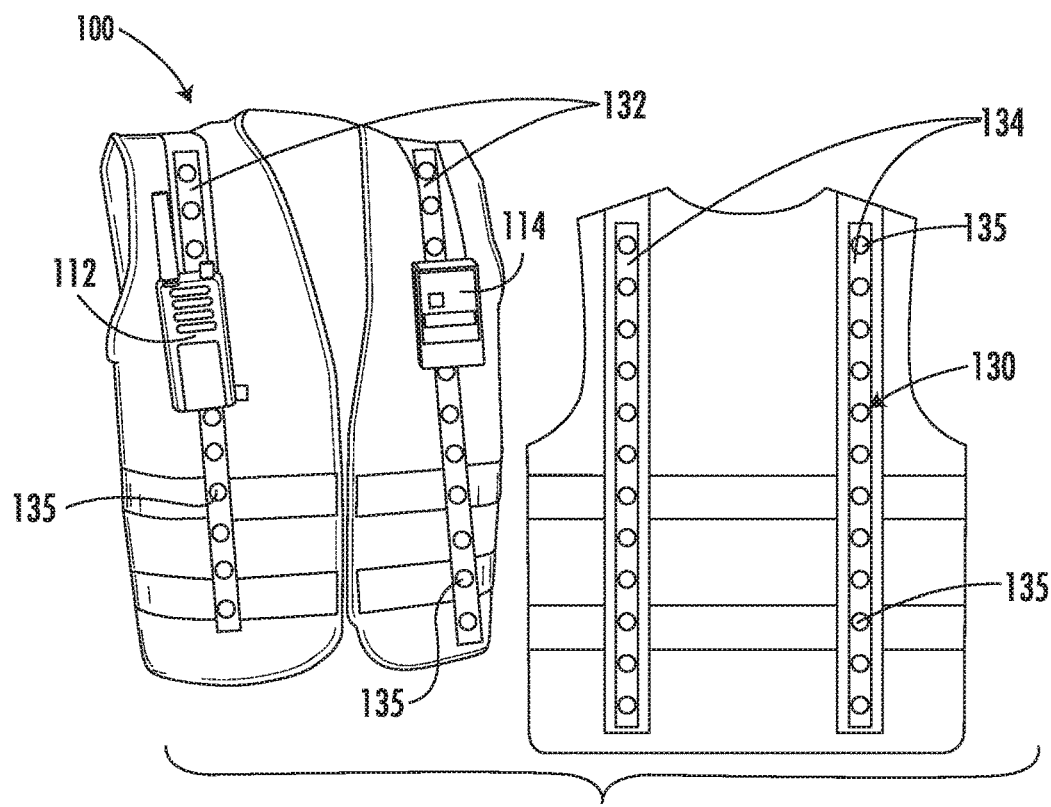
FIG. 3 is a front view and a rear view of the smart vest illustrated in FIG. 1 with improved visibility for use in a railyard in accordance with an embodiment of the present invention.

FIG. 3 illustrates a smart vest 100 with an LED lighting system 130. The LED lighting system 130 may include one or more front LED lighting strips 132 along the front of the vest 100 and one or more rear LED lighting strip 134 along the rear of the vest 100. The LED lighting strips 132, 134 may include a plurality of LEDs 135. The LED lighting system 130 may be visible during the day and night, while also being visible in various weather situations, such as rain or snow or fog. The LEDs 135 on the LED lighting system 130 may provide blinking lights or steady lights depending on various situations. The blinking lights and steady lights may be utilized to provide a visual communication of various actions or states of the railyard crew member or railyard system. For example, to provide more warning, the LEDs 135 may blink for a dangerous condition.

Additionally, the LEDs 135 on the LED lighting system 130 may provide various color choices. The colors on the LEDs 135 can change to provide visual communication of various actions or states of the railyard crew member or railyard system. For example, the LEDs 135 may be red for a dangerous condition and green for clear of tracks/cars. Various other color combinations for the LEDs 135 may be utilized without departing from this invention. The vest processor 105 may provide instructions to the LEDs to change colors and/or blink or stay steady.

Figure 4:
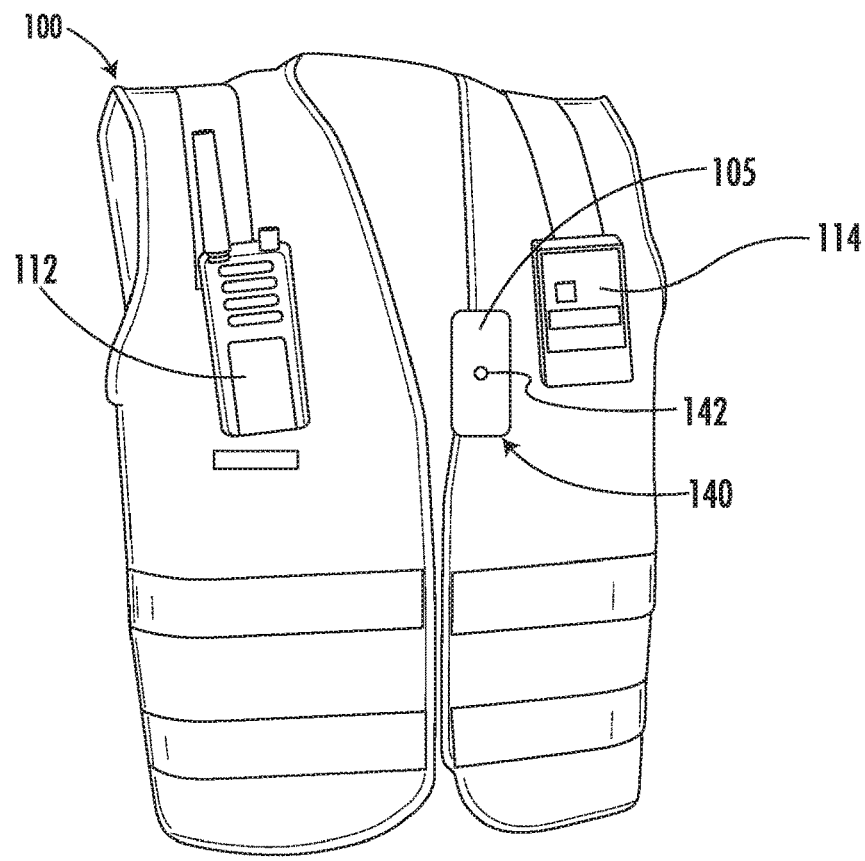
FIG. 4 is a front view of the smart vest illustrated in FIG. 1 with a real-time camera for use in a railyard in accordance with an embodiment of the present invention.

FIG. 4 illustrates a smart vest 100 with a real-time camera system 140. The real-time camera 140 may include a 35-mm lens 142 or equivalent and may be capable of taking 8-mega pixel still pictures. Other types or lens and/or levels of resolution may be utilized with the real-time camera system 140 without departing from this invention. The real-time camera 140 may also include a video capability that can record video in one of the following resolutions: 1080p, 30 fps; 720p, 60 fps; and 640×480p, 60 fps/90 fps. Other video resolutions may be utilized with the real-time camera system 140 without departing from this invention. The real-time camera 140 may also have a wide field of view, such as 62(h)×49(v) degree field of view. Other fields of view for the real-time camera 140 may be utilized without departing from this invention. The real-time camera 140 may also include visible and infrared options, thus making the real-time camera 140 operable in various environments, such as weather, and night or darkness.

The real-time camera system 140 may be connected to the vest processor 105. Further, the real-time camera system 140 may include a processor that connects to the vest processor 105. The vest processor 105 and/or processor on the real-time camera system 140 may capture and store locally the video and pictures on the smart vest 100. If an incident occurs, the video and pictures stored locally on the real-time camera system 140 may be retrieved for further review. Additionally, in another embodiment, the real-time camera system 140, through the vest processor 105 or processor, may be connected wirelessly to a railyard site computer. The real-time camera 140 may broadcast or stream to the locomotive 20 and/or the railyard site computer. The real-time camera system 140 may be utilized to view railyard crew member activity in real-time and providing real-time video of the current operations and activities from the smart vest 100. The real-time camera system 140 may provide a real-time transfer of information via videos and pictures without a delay or lag. Additionally, video and pictures may be stored remotely on the railyard site computer.

Figure 5:
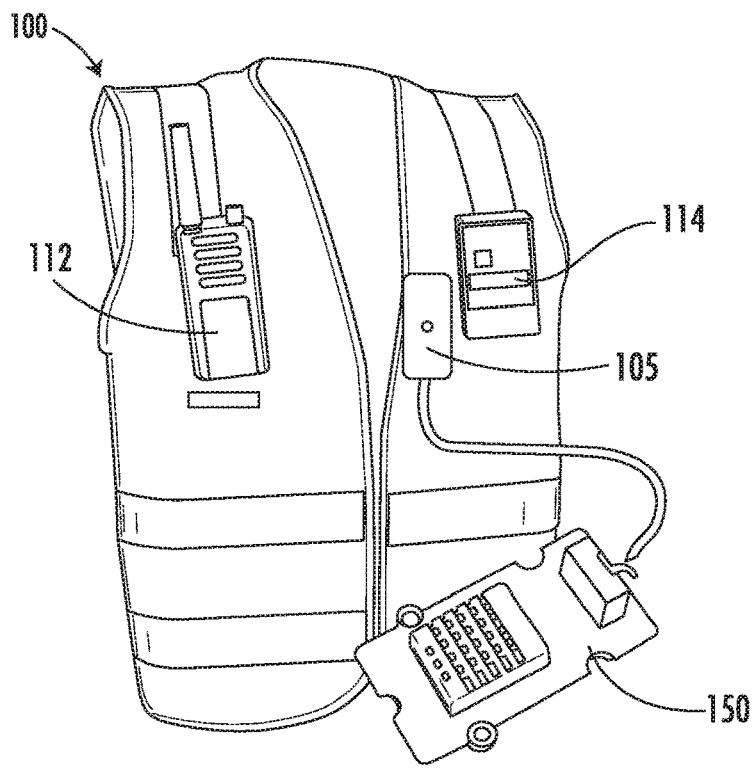
FIG. 5 is a front view of the smart vest illustrated in FIG. 1 with an environmental monitoring system for use in a railyard in accordance with an embodiment of the present invention.

FIG. 5 illustrates a smart vest 100 with an environmental monitoring system 150. The environmental monitoring system 150 may be connected to the vest processor 105. The environmental monitoring system 150 may include a humidity sensor. The environmental monitoring system 150 may include a temperature sensor that may sense both the outside air temperature and/or the railyard crew member's body temperature. Additional environmental factors may be monitored by the environmental monitoring system 150 without departing from this invention. The environmental monitoring system 150 may detect dangerous conditions for the railyard crew member, such as: hypothermia, hyperthermia, heat exhaustion, dehydration, heat stroke, or frostbite, etc. Additionally, the environmental monitoring system 150 may track a railyard crew member's last water intake and/or rest and/or work schedule. The vest processor 105 may send the information/data from the environmental monitoring system 150 to the railyard site computer for further analysis and action, such as remedial training and/or corrective actions for the railyard crew members.

Figure 6:
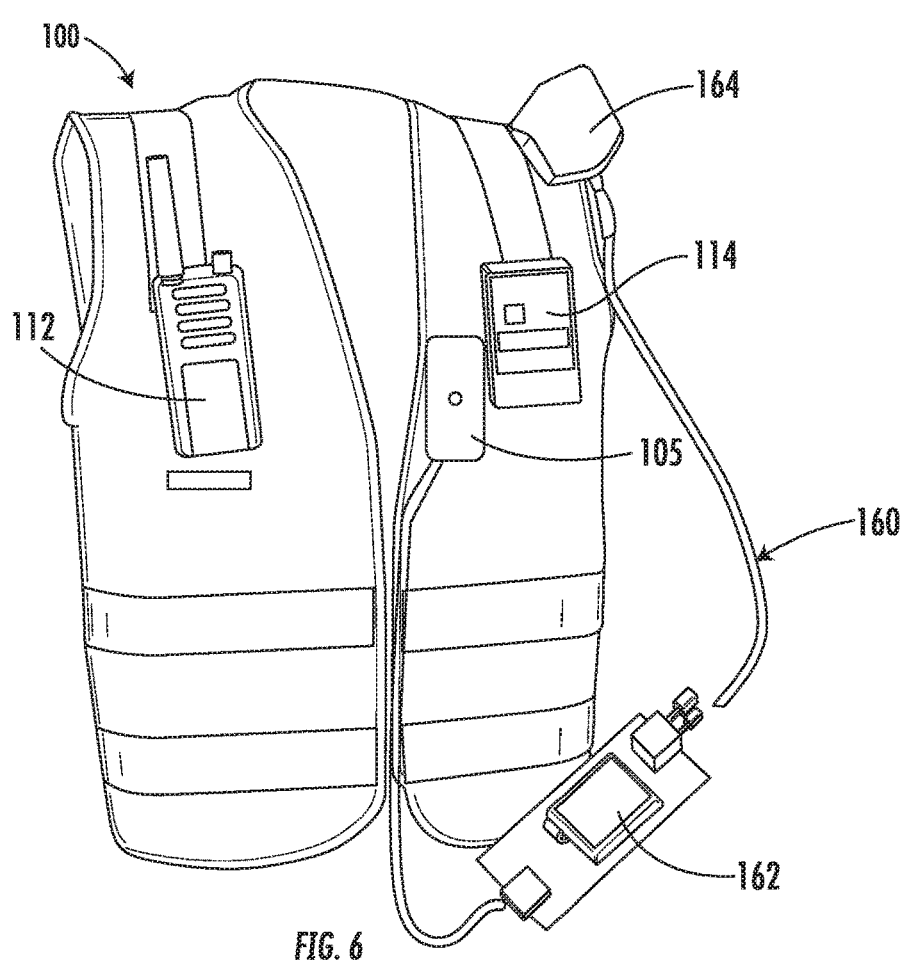
FIG. 6 is a front view of the smart vest illustrated in FIG. 1 with high-accuracy location features for use in a railyard in accordance with an embodiment of the present invention.

FIG. 6 illustrates a smart vest 100 with a high-accuracy location system 160. The high-accuracy location system 160 may be connected to the vest processor 105. The high-accuracy location system 160 may utilize both GNSS (global navigation satellite system) and RTK (real-time kinematics) technologies to provide the ability to enable centimeter location accuracy with the high-precision GPS. The high-accuracy location system 160 may include an RTK module 162 and a GPS antenna 164. The RTK module 162 may be for example a UBLOX NEO-M8T model. The RTK module 162 may provide and deliver high-integrity, precision timing in demanding applications world-wide. The RTK module 162 may include enhanced sensitivity and concurrent constellation reception to extend coverage and integrity for challenging signal environments. The RTK module 162 may include timing integrity measures with Receiver Autonomous Integrity Monitoring (RAIM) and continuous phase uncertainty estimation. The RTK module 162 may feature high dynamic range radios with both analog and digital interference mitigation, supporting applications in wireless communications equipment. Other similar RTK modules or processors may be utilized with these features that are known and used in the art.

Figure 9:
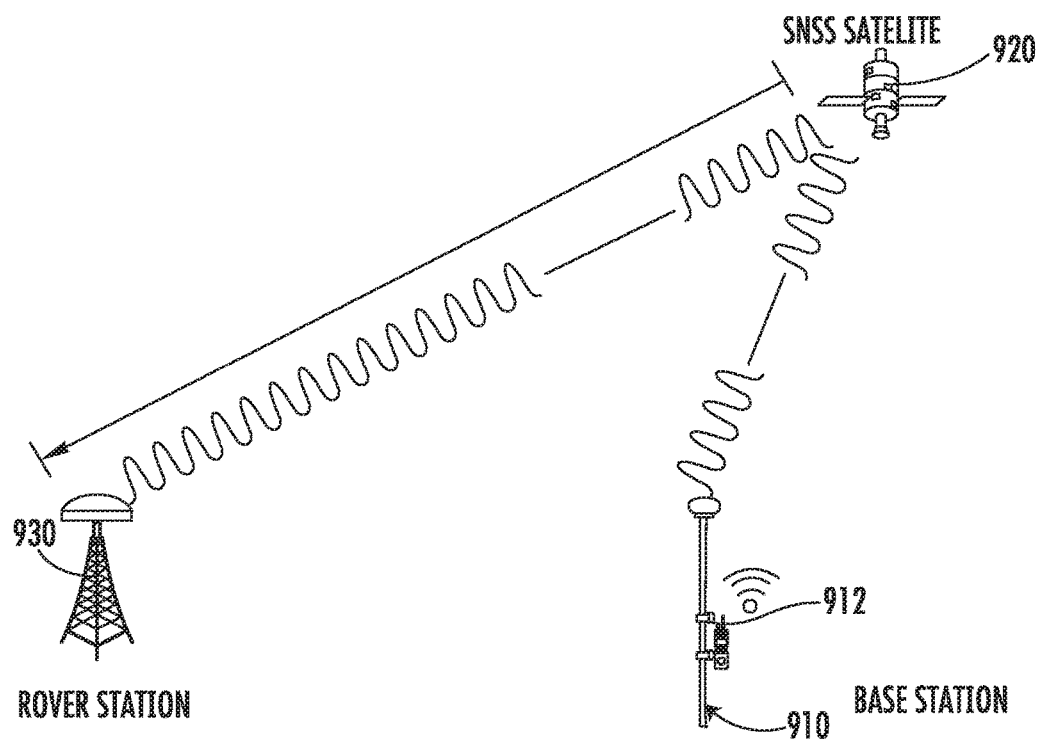
FIG. 9 is a diagram illustrating a high-accuracy location system for use in a railyard in accordance with an embodiment of the present invention.

GNSS stands for "global navigation satellite system" which is standard generic term for satellite navigation systems that provide autonomous geo-spatial positioning with global coverage. RTK stands for "real-time kinematics" which is generally a satellite navigation technique used to enhance the precision of position data derived from satellite-based positioning systems (GNSS) such as GPS, GLONASS, Galileo, Beidou and other regional systems. RTK uses measurements of the phase of the signal's carrier wave, rather than the information content of the signal, and relies on a single reference station or interpolated virtual station to provide real-time corrections, providing up to centimeter-level accuracy. FIGS. 9 and 10 further illustrate the high-accuracy location system 160.

FIG. 9 illustrates an example generic high-accuracy location system 900 via GNSS and RTK. The high-accuracy location system 900 may include a GPS receiver 912 on a station whose position is known exactly, a base station 910. The base station 910 receiver's computer can calculate its position from satellite data from a GNSS satellite(s) 920, compare that position with its actual known position, and find the difference. The resulting error corrections can be communicated from the base station 910 to a rover station 930. The errors are constantly changing so the base station 910 will monitor the errors continuously, at least when the rover receiver or receivers 930 are working. While this is happening, the rover stations 930 move from place to place, collecting the points for positions relative to the base station 910. Then, the base station 910 corrections and the rover station's data 930 is combined together through a data link in real-time, or may be applied later in postprocessing. Additionally, the number of carrier cycles from the satellite 920 to the rover stations 930 may be determined and used to calculate the range of the rover stations 930.

Figure 10A:
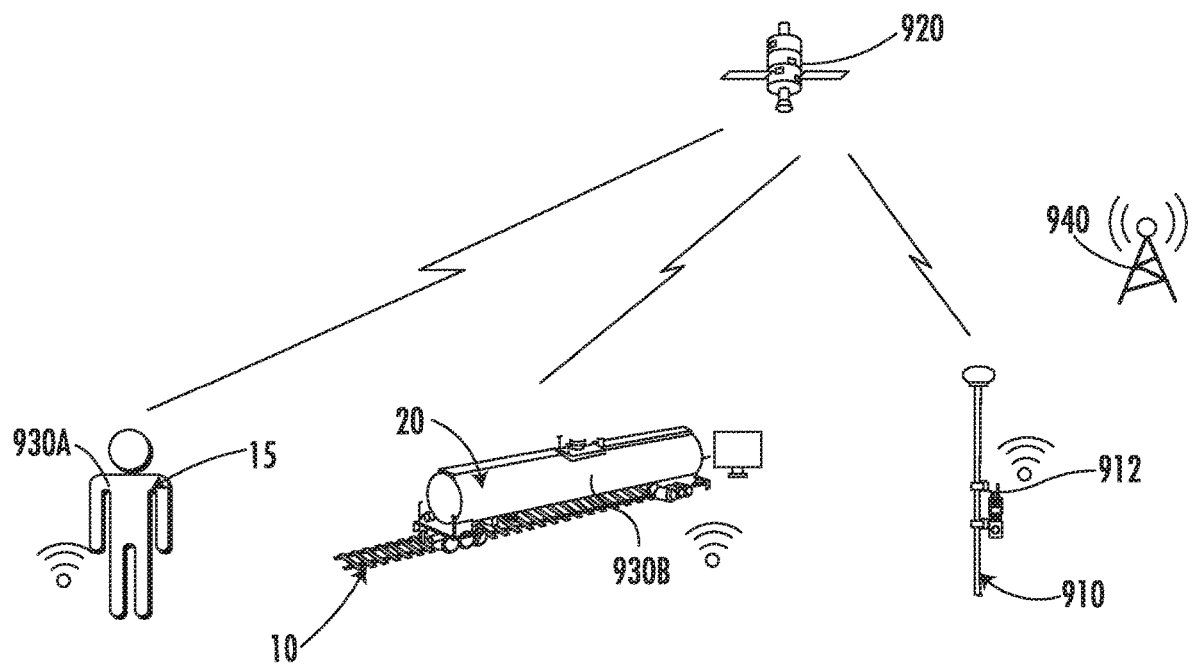
FIG. 10A is a diagram illustrating the high-accuracy location system from FIG. 9 for the smart vest illustrated in FIG. 1 for use in a railyard in accordance with an embodiment of the present invention.
Figure 10B:
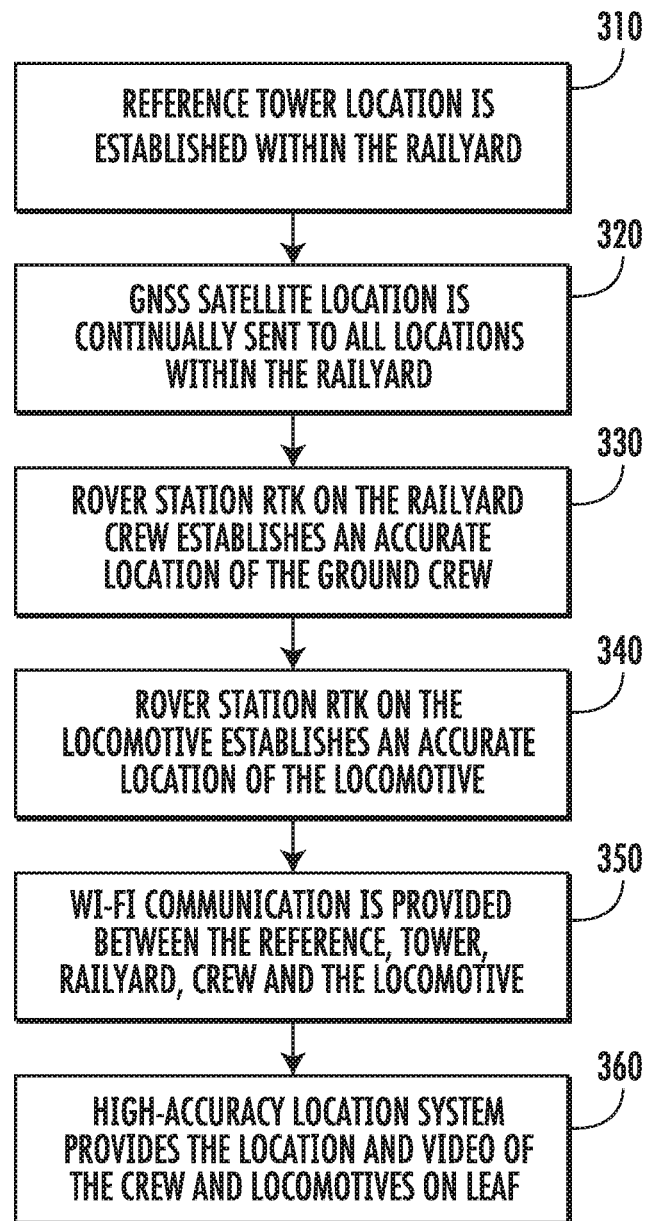
FIG. 10B is flow diagram illustrating the method of the high-accuracy location system from FIG. 10A for use in a railyard in accordance with an embodiment of the present invention.

FIGS. 10A and 10B illustrate how an example high-accuracy location system 160 may be configured within a railyard 10. The high-accuracy location system 160 may include a base tower or reference tower 910. The reference tower 910 location is a confirmed and static location within the railyard 10. The high-accuracy location system 160 may also include an RTK rover station 930A for a railyard crew 15 via the smart vest 100 and an RTK rover station 930B for a locomotive 20. The high-accuracy location system 160 may include a wireless communication network 940 that connects each of systems throughout the railyard 10, such as providing Wi-Fi communication between the reference tower 910, railyard crew 15, and the locomotive 20. By using the Wi-Fi communication, the communications stays within the railyard 10 and the communication does not rely on a cellular network and/or cellular service.

FIG. 10B specifically illustrates the steps of the high-accuracy location system 160 within the railyard 10. First (310), the reference tower 910 location is established within the railyard 10 at a static location. Next (320), the GNSS satellite 920 location is continually sent to all locations within the railyard 10. Next (330), the rover station RTK 930A on the railyard crew 15 establishes an accurate location of the ground crew 15 through the GNSS satellite 920 and the RTK 930A. Next (340), the rover station RTK 940A on the locomotive 20 establishes an accurate location of the locomotive 20 through the GNSS satellite 920 and the RTK 940A. Throughout the process (950), Wi-Fi communication is provided between the reference tower 910, railyard crew 15, and the locomotive 20 through the Wi-Fi tower and system 940 within the railyard 10. Lastly (960), the high-accuracy location system 160 provides the location and video of the crew 15 and locomotives 20 within the railyard 10.

Figure 7:
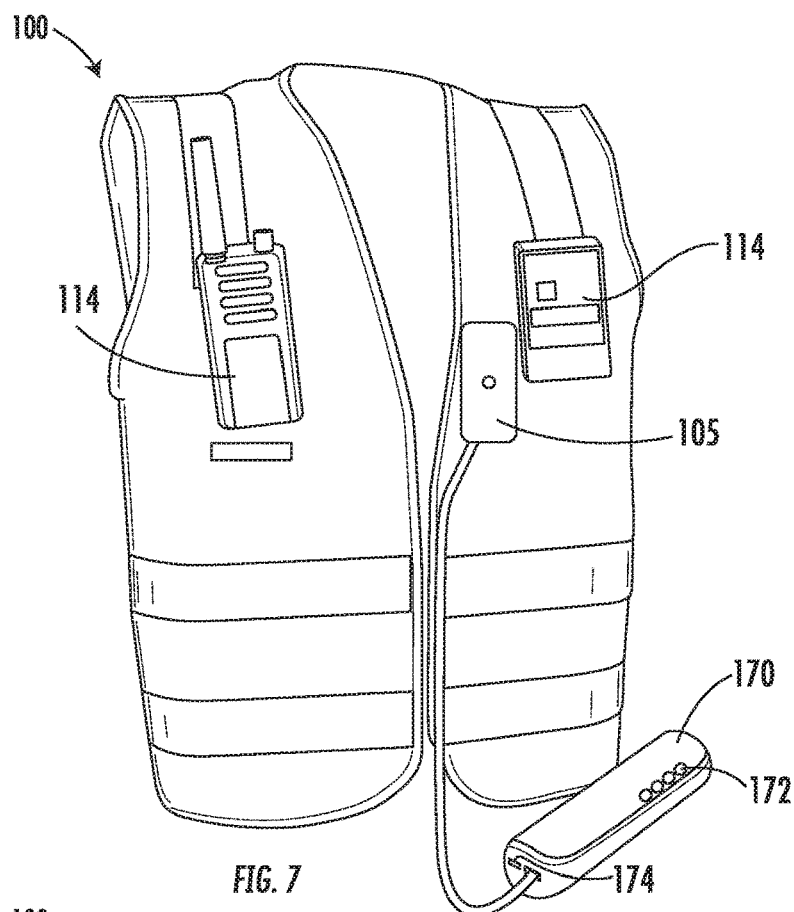
FIG. 7 is a front view of the smart vest illustrated in FIG. 1 with mobile power for use in a railyard in accordance with an embodiment of the present invention.

FIG. 7 illustrates a smart vest 100 with a mobile power unit 170. The mobile power unit 170 may be connected to the vest processor 105. The mobile power unit 170 may provide power to the vest processor 105, the smart vest 100, and other systems on the smart vest 100. The mobile power unit 170 may be a low-cost battery pack that may be used to typically recharge phones. The mobile power unit 170 may be 8,000 mAh with 2.1 A output. Other power output may be utilized with the mobile power unit 170 without departing from this invention. The mobile power unit 170 may include an LED battery status indicator 172. The LED battery status indicator 172 may include a 4-dot LED indicator or other numbers of dots without departing from this invention. The mobile power unit 170 may be capable of at least 40+ hours of operation or other time amounts without departing from this invention. The mobile power unit 170 may be recharged with a standard micro-USB port 174 or other recharging methods known and used in the art. The mobile power unit 170 may have more or less weight which will generally lead to more or less power in the unit.

Figure 8:
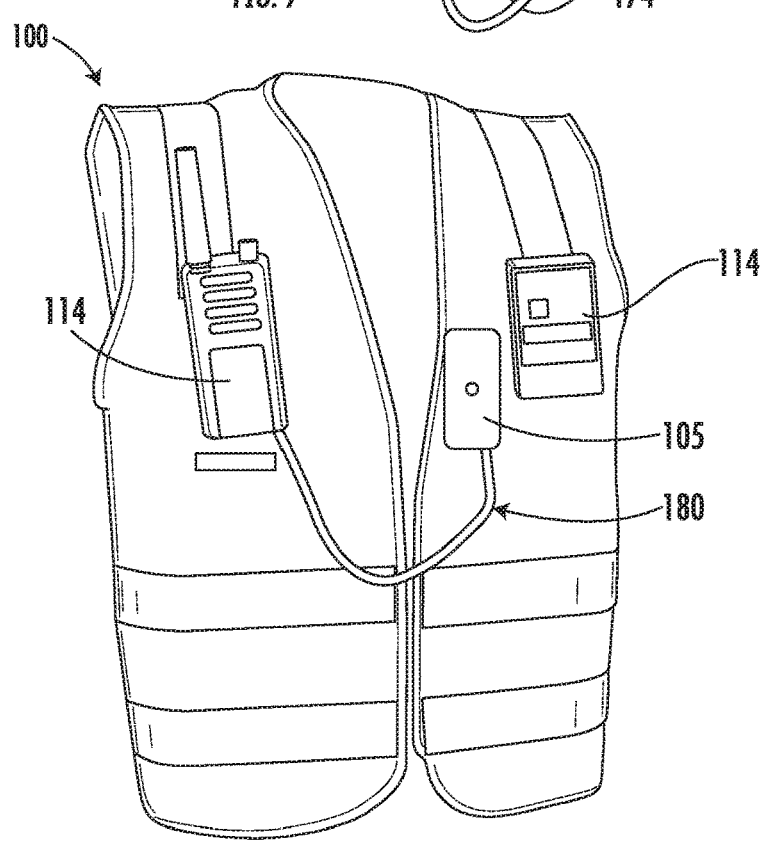
FIG. 8 is a front view of the smart vest illustrated in FIG. 1 with real-time communication for use in a railyard in accordance with an embodiment of the present invention.

FIG. 8 illustrates a smart vest 100 with a real-time communication system 180. The real-time communication system 180 may be connected to the vest processor 105. Generally, the real-time communication system 180 may include the two-way radio 112 which may be connected to the vest processor 105. The vest processor 105 and the real-time communication system 180 may record audio. The audio may be analyzed through speech and text means. The audio may also be analyzed to help signal intent and moves within the railyard. Additionally, the smart vest 100 may include buttons that can send commands over the radio 112 to provide redundancy of communications.

Figure 11A:
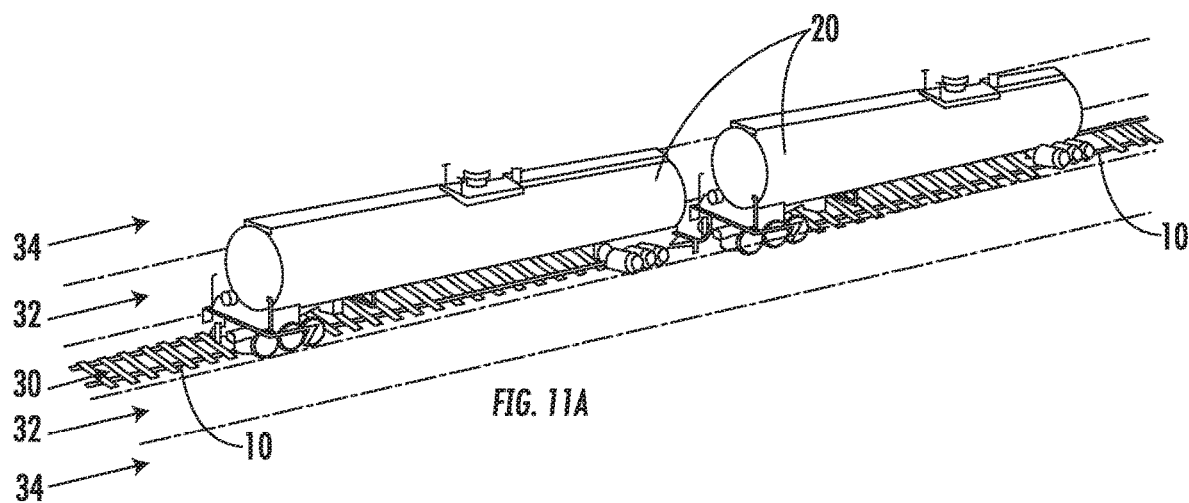
FIGS. 11A and 11B are diagrams illustrating the high-accuracy location system from FIG. 9 to determine the position of a crew for use in a railyard in accordance with an embodiment of the present invention.
Figure 11B:
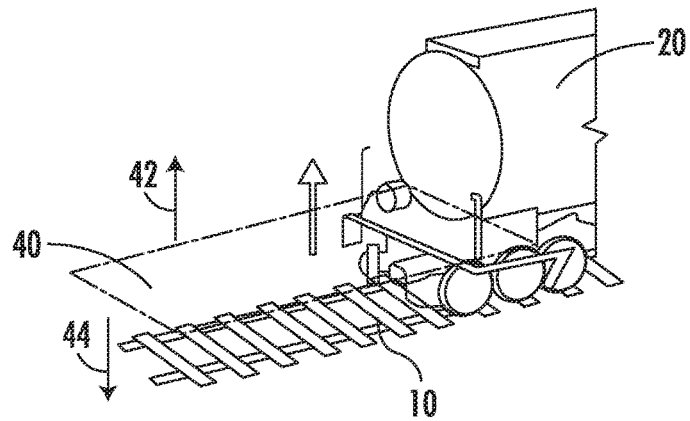

Additionally, as illustrated in FIGS. 11A and 11B, the smart vest 100 and the vest processor 105 may detect the "state" of the railyard ground crew 15. For example, as illustrated in FIG. 11A, one or more railcars 20 may be located on the rails of the railyard. It is important in these situations to determine the position of the crew 15. The high-accuracy location system 160 may be utilized to determine the position of the crew 15 with respect to the railcars 20. The position of the crew 15 may be determined as: 1) between cars/tanks 20 assuming we know the location of the equipment; 2) whether the crew 15 is riding on the railcars 20 based upon their height with respect to the ground; and 3) whether the crew 15 is on the tracks 30, near the tracks 32, or far from the tracks 34. Through the use of the smart vest 100, this information may be visualized in the cab of the railcars and/or a central location within the railyard 10 that monitors the safety situation within the railyard 10. FIG.

11B specifically illustrates how the smart vest 100 and the high-accuracy location system 160 helps to define the state based on the height of the railyard crew 15. As has been described above, the high-accuracy location system 160 has the capability to determine high-precision location to not only include ground location, but also height or distance from the ground. Because the high-accuracy location system 160 determines a height, the state of the railyard crew 15 may be determined based on a certain height 40. Below a certain height 44, the railyard crew 15 may be determined to be on the ground. If the crew 15 is determined to be on the ground, there may be an unsafe condition if within the rail and within a certain distance of the railcars 20. If the crew 15 is determined to be on the ground, the crew 15 may be safe if they are located away from the railcars 20. Above a certain height 42, the crew 15 may be determined to be riding on the railcar/tank 20. Generally, in this situation, the crew 15 may be determined to be safe. Additionally, equipment position information (if available) could be used for a safety redundancy check.

Additionally, in another embodiment of the present invention, the data from the smart vest 100 and the vest processor 105 may be transmitted to a geo-stationary communications satellite and/or a cellular system to one or more remote receiving station(s). The receiving station may transmit the data via the Internet to a web based portal which is accessible by a user via a workstation. Data collected and transmitted can be from any smart vest 100 or vest processor 105. As was described above, the smart vest 100 or vest processor 105 may feature a number of additional data collection outputs. Outputs from all of the data from the smart vest 100 or vest processor 105 may be combined together to electronically represent the status or condition of the railyard 10, railyard crew 15, and/or locomotives 20.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, it will be apparent to those skilled in the art that changes and modifications may be made therein without departing from the spirit of the invention, the scope of which is defined by this description.

We claim:

1. A vest for a railyard crew member for use in a railyard, the vest comprising:
    a vest processor that includes a processing unit and a system memory to store and execute software instructions, wherein the vest processor is in communication with and connected to a railyard site computer that provides a central analysis and a display site for the railyard;
    a real-time camera system connected to the vest processor, the real-time camera system including a still picture capability and a video capability that captures and stores the pictures and videos on the vest processor, wherein the real-time camera system provides a real-time video of current operations and activities from the vest and sends the real-time video to the railyard site computer;
    a high-accuracy location system connected to the vest processor, the high-accuracy location system including a real-time kinematics (RTK) module and a GPS antenna located on the vest, wherein the high-accuracy location system utilizes a global navigation satellite system (GNSS) and RTK to enable centimeter location accuracy of the railyard crew member for the high-accuracy location system; and
    a real-time communication system connected to the vest processor, the real-time communication system including a two-way radio that records and analyzes audio, wherein the railyard site computer receives and displays data of the railyard crew member from the real-time camera system, the high-accuracy location system, and the real-time communication system.

2. The vest of claim 1, further including an LED lighting system connected to the vest processor, the LED lighting system including one or more front LED lighting strips along a front of the vest and one or more rear LED lighting strips along a rear of the vest, the front LED lighting strip and the rear LED lighting strip including a plurality of LEDs.

3. The vest of claim 1, further including an emergency action system connected to the vest processor, the emergency action system providing the railyard crew member an emergency stop protection should the railyard crew member observe a situation that is determined to be unsafe.

4. The vest of claim 1, wherein the high-accuracy location system includes an RTK module and a GPS antenna for one or more railcars at the railyard to provide centimeter location accuracy of the one or more railcars.

5. The vest of claim 4, wherein the high-accuracy location system determines a position of the railyard crew member with respect to a locomotive and the one or more railcars in the railyard.

6. The vest of claim 5, wherein the high-accuracy location system determines a height of the railyard crew member with respect to the ground, and further wherein if the determined height is below a certain height, the railyard crew member will be determined to be on the ground and potentially in a dangerous condition, and if the determined height is above the certain height, the railyard crew member will be determined to be riding on one of the railcars and in a safe condition.

7. The vest of claim 1, wherein the real-time camera system includes an infrared camera.

8. The vest of claim 1, wherein the real-time camera system is connected wirelessly to the railyard site computer such that the real-time camera system streams real-time video to the railyard site computer for display and storage.

9. A vest for a railyard crew member for use in a railyard, the vest comprising:
    a vest processor that includes a processing unit and a system memory to store and execute software instructions, wherein the vest processor is in communication with and connected to a railyard site computer that provides a central analysis and a display site for the railyard;
    an emergency action system connected to the vest processor, the emergency action system providing the railyard crew member an emergency stop protection should the railyard crew member observe a situation that is determined to be unsafe;

a real-time camera system connected to the vest processor, the real-time camera system including a still picture capability and a video capability that captures and stores the pictures and videos on the vest processor, wherein the real-time camera system provides a real-time video of current operations and activities from the vest and sends the real-time video to the railyard site computer;

a high-accuracy location system connected to the vest processor, the high-accuracy location system including a real-time kinematics (RTK) module and a GPS antenna located on the vest, wherein the high-accuracy location system utilizes a global navigation satellite system (GNSS) and RTK to enable centimeter location accuracy of the railyard crew member for the high-accuracy location system, wherein the high-accuracy location system includes an RTK module and a GPS antenna for a locomotive at the railyard to provide centimeter location accuracy of the locomotive; and a real-time communication system connected to the vest processor, the real-time communication system including a two-way radio that records and analyzes audio, wherein the railyard site computer receives and displays data of the railyard crew member and the locomotive from the real-time camera system, the high-accuracy location system, and the real-time communication system.

10. The vest of claim 9, wherein the high-accuracy location system determines a position of the railyard crew member with respect to one or more railcars in the railyard.

11. The vest of claim 10, wherein the high-accuracy location system determines a height of the railyard crew member with respect to the ground, and further wherein if the determined height is below a certain height, the railyard crew member will be determined to be on the ground and potentially in a dangerous condition, and if the determined height is above the certain height, the railyard crew member will be determined to be riding on one of the railcars and in a safe condition.

12. The vest of claim 9, further including an LED lighting system connected to the vest processor, the LED lighting system including one or more front LED lighting strips along a front of the vest and one or more rear LED lighting strips along a rear of the vest, the front LED lighting strip and the rear LED lighting strip including a plurality of LEDs.

13. The vest of claim 9, wherein the real-time camera system includes an infrared camera.

14. The vest of claim 9, wherein the real-time camera system is connected wirelessly to the railyard site computer such that the real-time camera system streams real-time video to the railyard site computer for display and storage.

15. A vest for a railyard crew member for use in a railyard, the vest comprising:

a vest processor that includes a processing unit and a system memory to store and execute software instructions, wherein the vest processor is in communication with and connected to a railyard site computer that provides a central analysis and a display site for the railyard;

an emergency action system connected to the vest processor, the emergency action system providing the railyard crew member an emergency stop protection should the railyard crew member observe a situation that is determined to be unsafe;

an LED lighting system connected to the vest processor, the LED lighting system including one or more front LED lighting strips along a front of the vest and one or more rear LED lighting strips along a rear of the vest, the front LED lighting strip and the rear LED lighting strip including a plurality of LEDs;

a real-time camera system connected to the vest processor, the real-time camera system including a still picture capability and a video capability that captures and stores the pictures and videos on the vest processor, wherein the real-time camera system provides a real-time video of current operations and activities from the vest and sends the real-time video to the railyard site computer;

an environmental monitoring system connected to the vest processor, the environmental monitoring system including a humidity sensor and a temperature sensor;

a high-accuracy location system connected to the vest processor, the high-accuracy location system including a real-time kinematics (RTK) module and a GPS antenna located on the vest, wherein the high-accuracy location system utilizes a global navigation satellite system (GNSS) and RTK to enable centimeter location accuracy of the railyard crew member for the high-accuracy location system;

a mobile power unit connected to the vest processor, the mobile power unit providing power to the vest processor and the vest; and a real-time communication system connected to the vest processor, the real-time communication system including a two-way radio that records and analyzes audio, wherein the railyard site computer receives and displays data of the railyard crew member from the real-time camera system, the high-accuracy location system, and the real-time communication system.

16. The vest of claim 15, wherein the real-time camera system is connected wirelessly to the railyard site computer such that the real-time camera system streams real-time video to the railyard site computer for display and storage.

17. The vest of claim 15, wherein the plurality of LEDs blink for a dangerous condition in the railyard.

18. The vest of claim 15, wherein the plurality of LEDs include various colors, such that red LEDs are used for a dangerous condition in the railyard and green LEDs are used for a clear condition in the railyard.

19. The vest of claim 15, wherein the real-time camera system includes an infrared camera.

20. The vest of claim 15, wherein the environmental monitoring system tracks a water intake of the railyard crew member and a rest/work schedule of the railyard crew member.

* * * * *